(12) United States Patent
Tsirkin

(10) Patent No.: US 12,020,053 B2
(45) Date of Patent: Jun. 25, 2024

(54) EXPOSING UNTRUSTED DEVICES TO VIRTUAL MACHINES

(71) Applicant: RED HAT, INC., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 561 days.

(21) Appl. No.: 17/215,836

(22) Filed: Mar. 29, 2021

(65) Prior Publication Data

US 2022/0308909 A1    Sep. 29, 2022

(51) Int. Cl.
*G06F 9/455*    (2018.01)
*G06F 13/42*    (2006.01)

(52) U.S. Cl.
CPC ...... *G06F 9/45558* (2013.01); *G06F 13/4221* (2013.01); *G06F 2009/45579* (2013.01); *G06F 2009/45587* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 9,032,122 B2 | 5/2015 | Hart et al. | |
| 9,424,199 B2 | 8/2016 | Kegel et al. | |
| 10,509,729 B2 * | 12/2019 | Sankaran | G06F 12/1081 |
| 2019/0228145 A1 | 7/2019 | Shanbhogue et al. | |
| 2020/0159969 A1 | 5/2020 | Shanbhogue et al. | |
| 2020/0379927 A1 | 12/2020 | Chan et al. | |

OTHER PUBLICATIONS

José Martins et al., "µRTZVisor: A Secure and Safe Real-Time Hypervisor", https://res.mdpi.com/d_attachment/electronics/electronics-06-00093/article_deploy/electronics-06-00093-v2.pdfOct. 30, 2017, Oct. 30, 2017, pp. 1-31.
Saul St. John, "Thunderbolt: Exposure and Mitigation", http://pages.cs.wisc.edu/~sstjohn/tg_old.pdf, University of Wisconsin—Madison, 2013.

* cited by examiner

*Primary Examiner* — Charlie Sun
(74) *Attorney, Agent, or Firm* — Dority & Manning, P.A.

(57) ABSTRACT

A method includes receiving, by a hypervisor executing on a computing system, a request to associate an input/output (I/O) device with a virtual machine running on the computing system. The I/O device corresponds to a physical device attached to a first peripheral bus of a first bus type. The method further includes determining whether the I/O device is a trusted I/O device. The method further includes, in response to determining that the I/O device is not a trusted I/O device, exposing the I/O device to the virtual machine via a first virtual bus of a second bus type. Exposing the I/O device to the virtual machine via the first virtual bus causes the virtual machine to initiate a first security protocol associated with the first virtual bus.

20 Claims, 4 Drawing Sheets

EXPOSING UNTRUSTED DEVICES TO VIRTUAL MACHINES

TECHNICAL FIELD

Embodiments of the present disclosure relate to virtualization systems, and more specifically, relate to exposing untrusted devices to virtual machines.

BACKGROUND

A virtual machine is a portion of software that, when executed on hardware of a host computer system creates an environment allowing for an abstraction of some physical components of the host computer system in order to allow running of various modules, for example, multiple operating systems, concurrently and in isolation from other modules. Virtualization permits, for example, consolidating multiple physical servers into one physical server running multiple virtual machines in order to enhance the hardware utilization rate. The host allocates a certain amount of its resources to each virtual machine. Each virtual machine can then use the allocated resources to execute applications, including operating systems (guest operating systems (OS)). A software layer providing the virtualization may be referred to as a hypervisor, a virtual machine monitor (VMM), or a kernel-based hypervisor, to name a few examples. The hypervisor emulates the underlying hardware of the host computer system, making the use of the virtual machine transparent to the guest OS and the user of the virtual machine. A virtual machine may have a virtual processor, virtual system memory, virtual storage, and various virtual I/O devices.

BRIEF DESCRIPTION OF THE DRAWINGS

The disclosure is illustrated by way of example, and not by way of limitation, and may be more fully understood with references to the following detailed description when considered in connection with the figures, in which.

DETAILED DESCRIPTION

Figure 1:
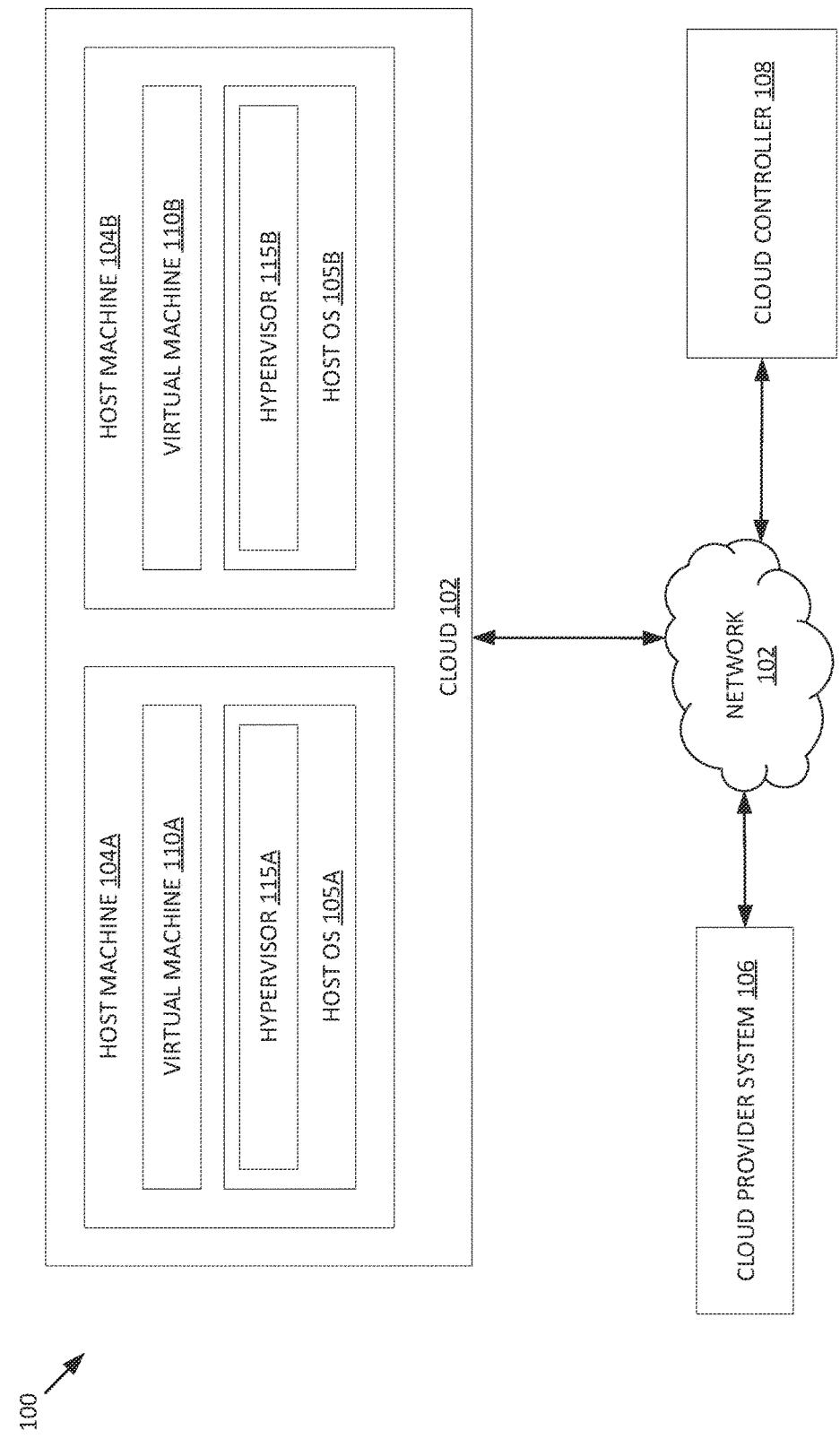
FIG. 1 illustrates a high-level component diagram of an example system architecture, in accordance with one or more aspects of the present disclosure.

Described herein are methods and systems for exposing untrusted devices to virtual machines. A hypervisor can abstract a physical peripheral device (e.g., a network interface card (NIC), a video adapter, or another input/output (I/O) device) of a host machine as a virtual device for a virtual machine. In some instances, the device can be coupled to physical bus of the host machine In some instances, such as for an input/output (I/O) device, the hypervisor can abstract the device by assigning particular port ranges of the device to the virtual machine an presenting the assigned port ranges to the virtual machine as the virtual device. During the runtime of the virtual machine, the hypervisor can intercept virtual I/O operations from the virtual device and handle the virtual I/O operation by forwarding the operation to an appropriate physical device at the host machine (e.g., the underlying I/O device, a memory device at the host machine, etc.).

A guest operating system (OS) can run on a virtual machine to manage virtual resources that are used to enable applications that run on the virtual machine. For example, the guest OS can enable an application running on the virtual machine to use a virtual device for the virtual machine. For untrusted devices, the guest OS would need to implement a more strict security protocol as compared to the trusted devices. In various illustrative examples, the security protocol can utilize IOMMU, bounce buffers, and/or implement other operations that provide isolation between portions of virtual memory that the virtual device is permitted to access and portions of virtual memory that the virtual device is not permitted to access. When a hypervisor receives a request to expose a device to a virtual machine as a virtual device, the hypervisor determines whether the device is under direct control by the hypervisor (referred to herein as a hypervisor-controlled device) or is under direct control by the host machine (referred to herein as an host-controlled device). The hypervisor abstracts the device in accordance with this determination. For example, in response to determining that an I/O device is a hypervisor-controlled internal I/O device, the hypervisor can abstract the hypervisor-controlled I/O device as a virtual device and transmit a notification to the guest OS for the virtual machine indicating that the I/O device underlying the virtual device is a hypervisor-controlled I/O device that is directly coupled to a peripheral bus at the host machine. The guest OS can initiate the appropriate I/O device security protocol for the virtual device. In another example, in response to determining that the I/O device is a host-controlled I/O device, the hypervisor can abstract the host-controlled I/O device as a virtual device and transmit a notification to the guest OS for the virtual machine indicating the I/O device underlying the virtual device is a host-controlled I/O device that is coupled to an external slot at the host machine. The guest OS can initiate the appropriate I/O device security protocol for the virtual device.

In some instances, a hypervisor-controlled device that is virtualized for a virtual machine is an untrusted device to the guest OS. For example, the manufacturer of the hypervisor-controlled I/O device can be an untrusted manufacturer to a guest OS of the virtual machine. In response to determining that the hypervisor-controlled I/O device is an untrusted I/O device, the guest OS can modify the security protocol to include additional protections against the virtual device that is an abstraction of the untrusted I/O device. These additional protections can include executing the same or similar operations that are included in a security protocol that is defined for a virtual device that is an abstraction of a host-controlled I/O device. Modifying the security protocol to include these additional protections can take a significant amount of time (e.g., several milliseconds), which can consume a significant amount of system resources. In addition, during the time that the guest OS is modifying the security protocol for the untrusted I/O device, the virtual device associated with the untrusted I/O device can execute one or more operations to access portions of memory that the untrusted I/O device would not otherwise be permitted to access had the additional protections been initially included in the security protocol for the virtual device. This can compromise the security and integrity of the virtual machine and, in some instances, the underlying host machine.

In other instances, a host-controlled I/O device that is virtualized for a virtual machine is a trusted device to the guest OS. During the runtime for the virtual machine, the guest OS can execute the security protocol including additional protection operations for the virtual device, even though the underlying host-controlled I/O device is a trusted device and such additional protection operations may not be necessary. As such, each operation initiated by the virtual device can take a significant amount of time due to the additional operations in the security protocol and can consume a significant amount of system resources. As a result, an overall system efficiency decreases and an overall system latency increases.

Implementations of the disclosure address the above-mentioned and other deficiencies by providing methods and systems for enhanced exposure of untrusted devices to a virtual machine. During initialization and/or runtime of the virtual machine, the hypervisor can receive a request to associate a device (e.g., an I/O device) of the host machine to a virtual machine. The hypervisor can determine whether the device is a trusted device by determining whether a set of parameters associated with the device corresponds to a set of trusted parameters associated with a trusted device. In some embodiments, the hypervisor can receive the set of trusted parameters from the virtual machine (e.g. during the initialization and/or runtime of the virtual machine). In response to determining that the device is an untrusted device, the hypervisor can expose (i.e., abstract) the device to the virtual machine as a virtual device coupled to a first virtual bus presented to the virtual machine as an abstraction of an external interface slot (e.g., a Thunderbolt slot) for the host machine. A guest OS for the virtual machine can detect that the virtual bus coupled to the virtual device is associated with the external interface slot for the host machine and can initiate a respective security protocol that is defined (e.g., by an owner of the virtual machine) for host-controlled I/O devices. As such, the hypervisor can expose an untrusted hypervisor-controlled I/O device to the virtual machine as a host-controlled I/O device, causing the guest OS to execute a security protocol associated with an host-controlled I/O device.

In some embodiments, the hypervisor can determine that the device of the request is a trusted device and can expose the trusted device to the virtual machine as a virtual device coupled to a second virtual bus presented to the virtual machine as an abstraction of an internal interface slot (e.g., a Peripheral Component Interconnect (PCI) slit) for the host machine. The guest OS can detect that the second virtual bus is associated with the internal interface slot and can initiate a respective security protocol that is defined for internal devices. As such, the hypervisor can expose a trusted host-controlled I/O device to the virtual machine as a hypervisor-controlled I/O device, causing the guest OS to execute a security protocol associated with an hypervisor-controlled I/O device.

By exposing untrusted devices to the virtual machine as host-controlled devices coupled to an external I/O slot and trusted devices as hypervisor-controlled devices coupled to an internal I/O slot, the hypervisor is able to cause the guest OS to initiate an appropriate security protocol for the virtual device without causing the guest OS to modify a security protocol defined by a virtual machine owner. For instance, the hypervisor can expose an untrusted hypervisor-controlled I/O device to the virtual machine as a host-controlled I/O device instead of as a hypervisor-controlled I/O device, as indicated to the guest OS by the virtual device connection to the first virtual bus. As a result, the guest OS initiates the security protocol for a host-controlled-controlled I/O device instead of the security protocol for a hypervisor-controlled-I/O device with additional security protections. Therefore, the guest OS does not waste a significant amount of system resources to add the additional security operations to the security protocol for the virtual device and the overall security and integrity of the virtual machine is improved. The hypervisor can also expose a trusted host-controlled I/O device to the virtual machine as a hypervisor-controlled I/O device instead of as a host-controlled I/O device, as indicated by the virtual device connection to the second virtual device. As a result, the guest OS can initiate the security protocol for a hypervisor-controlled I/O device instead of the security protocol for a host-controlled I/O device, which decreases the amount of waste for system resources, increasing overall system efficiency and decreasing overall system latency.

FIG. 1 illustrates a high-level component diagram of an example system architecture 100, in accordance with one or more aspects of the present disclosure. In some embodiments, system architecture can be or include a virtualized cloud system. It should be noted that other architectures for system architecture 100 are possible, and that the implementation of a virtualized cloud system utilizing embodiments of the disclosure are not necessarily limited to the specific architecture depicted by FIG. 1.

As shown in FIG. 1, system architecture 100 can include a cloud computing environment 102 (referred to herein as a cloud). Cloud 102 can include one or more nodes that are configured to execute applications and/or processes associated with applications. A node refers to a group of physical or virtual computing resources that provide computing functionality serving as the execution environment for an application of a cloud computing system. In some embodiments, a "node" can refer to a virtual machine, such as virtual machine 110A and/or virtual machine 110B that is hosted on a physical machine, such as host machine 104A and/or host machine 104B. For example, physical machines of host machine 104A and/or host machine 104B (referred to individually or collectively as host machine 104 herein), can host virtual machine 110A and/or virtual machine 110B (referred to individually or collectively as virtual machine 110 herein) in cloud 102 provided by cloud provider system 106.

Host machine 104 can be a computing device (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to host virtual machine 110, in accordance with the present disclosure. Host machine 104 can include one or more processing devices, such as a physical central processing unit (CPU) and/or a physical graphics processing unit (GPU). The one or more processing devices can be and/or include a microprocessor, digital signal processor (DSP), or other processing components. Each processing device can process various received data and can carry out the code or instructions or one or more computer programs, for example, to provide input/output operations specified by the instructions. It should be noted that although some embodiments of the present disclosure are directed to one or more operations performed by or at a physical CPU or a virtual CPU, any type of processing device, e.g., as provided above, can be used to perform such operations.

Host machine 104 can further include memory. Memory can include volatile memory devices (e.g., random access memory (RAM)), non-volatile memory devices (e.g., flash memory), storage devices (e.g., a magnetic hard disk, a Universal Serial Bus (USB) solid state drive, a Redundant Array of Independent Disks (RAID) system, a network attached storage (NAS) array, etc.), and/or other types of memory devices. It should be noted that even though host machine 104 can include a single processing device, this is merely illustrative, and that in some other examples, each server can include a two or more processing devices. Similarly, in some other examples, host machine 104 can include two or more memory components, rather than a single memory component.

As described above, host machine 104 can host one or more virtual machines 110. Host machines 104A and 104B can each execute an operating system (OS), such as host OS 105A and host OS 105B, respectively. Host OS 105A and/or host OS 105B (referred to individually and collectively as host OS 105 herein) can manage one or more physical resources of host machine 104. Host OS 105A and host OS 105B can each include a hypervisor component, such as hypervisor 115A and hypervisor 115B, respectively. Hypervisor 115A and/or hypervisor 115B (referred to individually and collectively as hypervisor 115 herein) can virtualize access to underlying host hardware, making the use of virtual machine 110 running on host machine 104 transparent to the guest OS running on virtual machine 110 and users (e.g., a system administrator) of host 104. In some embodiments, hypervisor 115 can be provided by an application running under host OS 105, or can be provided directly on host machine 104 without an OS beneath it. Hypervisor 115 can abstract a physical layer of host machine, including processors, memory, I/O devices, etc., and present this abstraction to virtual machine 110 as virtual devices. Virtual machine 110 can execute a guest OS (not shown), which can utilize underlying virtual processors (also referred to as virtual CPUs (vCPUs)), virtual memory, and/or virtual I/O devices.

In some embodiments, processor virtualization can be implemented by hypervisor 115 scheduling time slots on one or more physical devices for a virtual machine. Device virtualization can be implemented by hypervisor 115 intercepting virtual machine memory read/write and/or I/O operations with respect to certain memory and/or I/O port ranges, and by routing hardware interrupts to virtual machine 110. Further details regarding device virtualization implemented by hypervisor 115 are provided with respect to FIGS. 2 and 3.

As illustrated in FIG. 1, host machine 104A and host machine 104B can reside in the same cloud (e.g., cloud 102), in some embodiments. For purposes of the current disclosure, a cloud (e.g., cloud 102) can be a public cloud, a private cloud, or a hybrid cloud. A public cloud refers to a cloud service that is accessible to the public, such as Amazon's Elastic Compute Cloud™ (ECC), Microsoft's Azure™ service, or Google's Compute Engine™, or other similar cloud service. A private cloud can be similar to a public cloud, but can be operated for a single organization and can be hosted and or managed by the organization or by a third-party. A hybrid cloud refers to a cloud computing service that is composed of a combination of private, public and community cloud services, from different service providers. In some embodiments, host machine 104A and host machine 104B can reside in different clouds. For example, host machine 104A can reside in a public cloud, a private cloud, or a hybrid cloud and host machine 104B can reside in another public cloud, another private cloud, or another hybrid cloud. In other or similar embodiments, host machine 104A and/or host machine 104B does not reside in a cloud and can be implemented by a computing device, such as a computing device described in connection with FIG. 4.

In some embodiments, system architecture 100 can also include a cloud controller 108. Cloud controller 108 can reside on one or more machines (e.g., server computers, desktop computers, etc.) and can manage the execution of applications in the cloud 102. Cloud controller 108 can be coupled to cloud provider system 106 and/or cloud 102 via a network 120. Network 120 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, system architecture 100 can include one or more client devices (not shown). A client device can be connected to host machine 104 in cloud 102 and cloud provider system 106 via network 120. A client device can include a computing device such as a personal computer (PC), a laptop, a mobile phone, a smart phone, a table computer, a netbook computer, a network-connected television, etc. In some implementations, a client device can also be referred to as a "client computing device" or a "user device."

Figure 2:
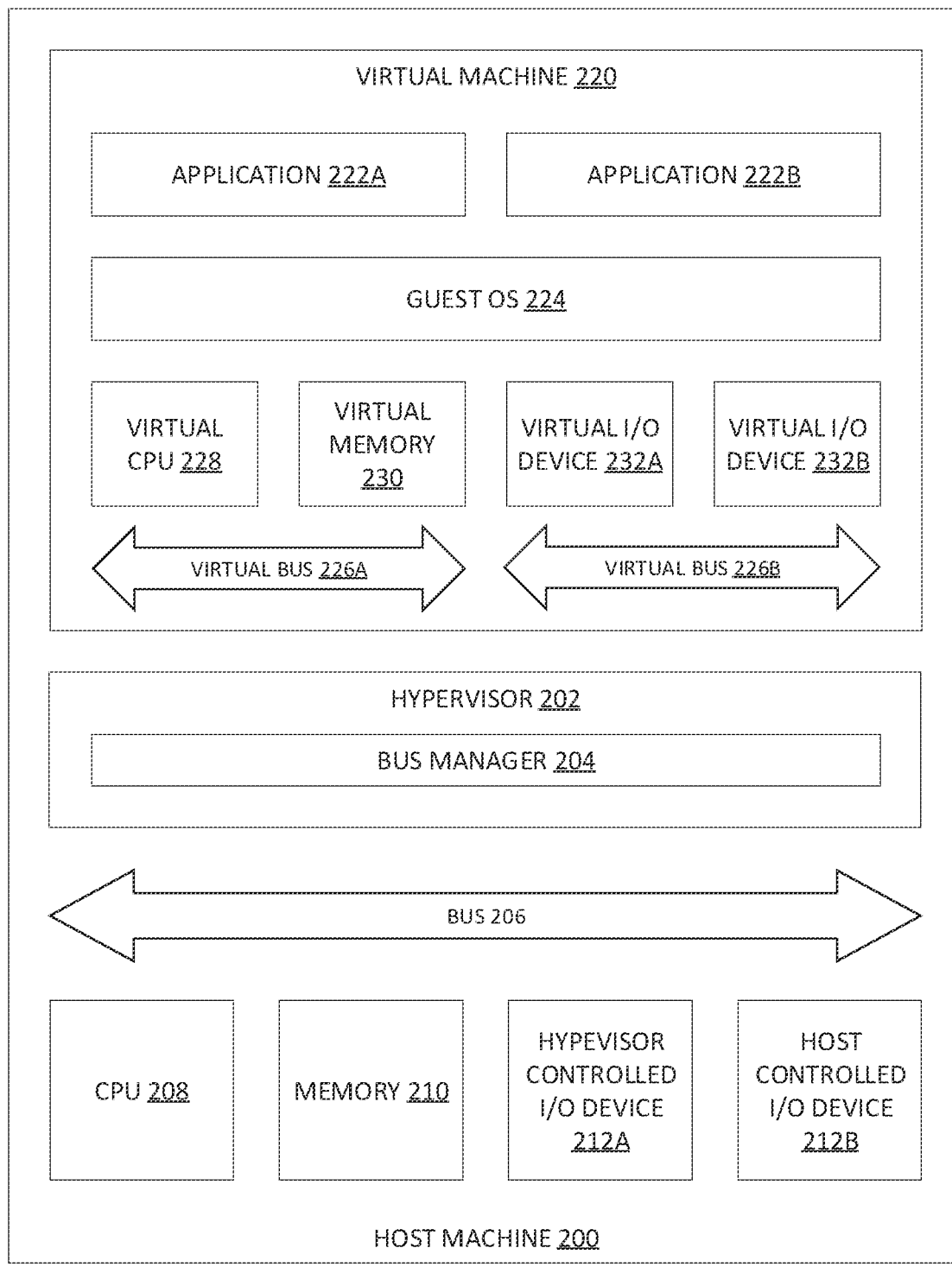
FIG. 2 illustrates an example of a host machine exposing an untrusted input/output (IO) device to a virtual machine, in accordance with implementations of the present disclosure.

FIG. 2 illustrates an example of a host machine 200 exposing an untrusted input/output (IO) device (e.g., I/O device 212A, I/O device 212B, etc.) to a virtual machine 220, in accordance with implementations of the present disclosure. In some embodiments, host machine 200 can correspond to host machine 104, described with respect to FIG. 1. Host machine 200 can execute hypervisor 202, which is configured to manage virtual machine 220 running on host machine 200. Hypervisor 202 can include a bus manager 204 that is configured to facilitate exposure of a physical device (or a component of a physical device) to virtual machine 220. It should be noted that although some embodiments of this disclosure are directed to hypervisor 202 and/or bus manager 204 exposing an I/O device to virtual machine 220, embodiments of this disclosure can be implemented for exposing any physical device of host machine 200 to virtual machine 220.

As described previously, host machine 200 can include one or more physical devices that can be used to host virtual machine 220. For example, host machine 200 can include a processing device 208 (e.g., a CPU), memory 210, and one or more I/O devices (e.g., I/O device 212A, I/O device 212B, etc.). CPU 208 can be communicatively coupled to memory 210 and I/O device 212A and/or I/O device 212B (referred to individually and collectively as I/O device 212 herein) via a host bus 206. In some embodiments, host bus 206 can be or include a Peripheral Component Interconnect (PCI) bus. A PCI bus is a parallel synchronized computer bus for attaching physical devices via PCI slots. An I/O device attached to the PCI bus via a PCI slot can take the form of an integrated circuit fitted into the motherboard itself (called a planar device in the PCI specification) or an expansion card that fits into a slot installed on the motherboard. Examples of an I/O device can include a network card, a sound card, a modem, a USB port, a TV tuner card, a disk controller, etc. For purposes of the present disclosure, an I/O device attached to the PCI bus is referred to as an internal I/O device.

In some embodiments, I/O devices that are external to host machine 104 can be connected to CPU 208 and/or memory 210 via host bus 206. For example, host machine 104 can include one or more external interface slots configured to enable connection between an external I/O device (referred to as an external I/O device herein) and host bus 206. In some embodiments, an external interface slot can include a Fibre Channel interface slot, a Small Computer System Interface (SCSI) slot, a Universal Serial Bus (USB) slot, a Thunderbolt slot, an Enhanced Integrated Drive Electronics (EIDE) slot, or a slot for another interface technology.

One or more applications (e.g., application 222A, application 222B, etc.) can run on virtual machine 220 under a guest OS 224. Guest OS 224 can utilize one or more virtual processors (e.g., virtual CPU 228), virtual memory 230, and/or one or more virtual I/O devices (e.g., virtual I/O device 232A, virtual I/O device 232A, etc.) to enable application 222A and/or application 22B running on virtual machine 220. Hypervisor 202 can abstract physical devices of host machine 200 and present this abstraction to virtual machine 220 as one or more virtual devices. In some embodiments, hypervisor 202 can abstract CPU 208 and present this abstraction to virtual machine 220 as virtual CPU 228. Hypervisor 202 can abstract CPU 208 for virtual machine 220 by scheduling time slots on CPU 228, rather than dedicating CPU 208 for virtual machine 220, in some embodiments. In other or similar embodiments, hypervisor 202 can abstract memory 210 and present this abstraction to virtual machine 220 as virtual memory 230. Hypervisor 202 can abstract memory 210 by employing a page table for translating virtual memory access associated with virtual memory 230 with physical memory addresses for memory 210. During a runtime for virtual machine 220, hypervisor 202 can intercept virtual memory access operations (e.g., read operations, write operations, etc.) and can translate a virtual memory address associated with the intercepted operations to a physical memory address at memory 210 using the page table.

Hypervisor 202 can abstract one or more I/O devices 212 at host machine 200 and present this abstraction to virtual machine 220 as one or more respective virtual I/O devices 232. In some embodiments, an I/O device at host machine 200 can be directly controlled by hypervisor 202. Hypervisor 202 can directly control an I/O device 212 by executing operations to directly access the I/O device. In other or similar embodiments, an I/O device 212 at host machine 200 may not be directly controlled by hypervisor 202 and instead is controlled by e.g., an OS at host machine 200 (not shown). For example, hypervisor 202 can control I/O device 212 by transmitting a request to the host OS to perform an operation for the I/O device 212. The host OS can determine whether to execute the operation (i.e., and enable hypervisor 202 to control I/O device 212) based on a security protocol associated with hypervisor 202 at host machine 200. As illustrated in FIG. 2, I/O device 212A can be a hypervisor-controlled I/O device and I/O device 212B can be a host-controlled I/O device.

Hypervisor 202 can abstract an I/O device 212 by assigning particular port ranges for an interface slot of the I/O device 212 to virtual machine 220 and presenting the assigned port ranges as virtual I/O device 232A. For example, hypervisor 202 can abstract hypervisor-controlled I/O device 212A by assigning particular port ranges for an internal interface slot (e.g., PCI slot) associated with I/O device 212A and presenting the assigned port ranges to virtual machine 220 as virtual I/O device 232A. In another example, hypervisor 202 can abstract host-controlled I/O device 212B by assigning particular port ranges for an external interface slot (e.g., Thunderbolt slot) of I/O device 212B an presenting the assigned port ranges to virtual machine 220 as virtual I/O device 232B.

In some embodiments, hypervisor 202 can associate a virtual I/O device 232 with a particular virtual bus 226. A virtual bus can be an abstraction of an interface slot of an I/O device 212 at host machine 200. For example, hypervisor 202 can abstract an internal interface slot (e.g., PCI slot) as virtual bus 226A and an external interface slot (e.g., Thunderbolt slot) as virtual bus 226B. Hypervisor 202 can intercept virtual I/O operations for a virtual I/O device 232 via an associated virtual bus 226 and can handle the intercepted virtual I/O operations in accordance with a security protocol for the associated virtual bus 226. Further details regarding the security protocol for an associated virtual bus 226 are provided below.

In some embodiments, a hypervisor 202 can associate a virtual I/O device 232 with a respective virtual bus 226 based on a determination of whether the virtual I/O device 232 is a trusted virtual I/O device or an untrusted virtual I/O device. A bus manager component 204 (also referred to as bus manager 204) of hypervisor 202 can determine that a virtual I/O device 232 is a trusted virtual I/O device by determining whether virtual I/O device 232 satisfies a security criterion. In some embodiments, bus manager 204 can determine that a virtual I/O device 232 satisfies a security criterion in response to determining that a set of parameters associated with the underlying I/O device 212 corresponds to a set of trusted parameters. In some embodiments, the trusted set of parameters can be stored at memory 210. The trusted set of parameters can include an identifier of a trusted I/O device manufacturer, an identifier of a trusted I/O device vendor, an identifier of a trusted geographic location corresponding to an I/O device manufacturer, an identifier of a trusted geographic location corresponding to an I/O device vendor, an indication of a device type for a trusted I/O device, and/or a driver type associated with the trusted I/O device. In some embodiments, one or more of the trusted set of parameters can be provided by an owner (e.g., a developer, an engineer) for host system 200 and/or cloud 102. In additional or alternative embodiments, hypervisor 202 can receive one or more of the trusted set of parameters from guest OS 224 (e.g., before or during an initialization of virtual machine 220, during a runtime of virtual machine 220, etc.). Hypervisor 202 can store the received parameters at memory 210.

In some embodiments, hypervisor 202 can associate an I/O device 212 with virtual machine 220 in response to a received request. For example, responsive to one or more pins and/or receptacles of I/O device 212 engaging with corresponding pins and/or receptacles of a slot at host machine 200, hypervisor 202 can receive the request (e.g., from a driver of the engaged I/O device 212) to associate the I/O device 212 with virtual machine 220. In some embodiments, the request can include the set of parameters associated with the I/O device 212. The set of parameters can include an identifier of a manufacturer associated with the I/O device 212, an identifier of a vendor associated with the I/O device 212, an identifier of a geographic location associated with the manufacturer of the I/O device 212, an identifier of a geographic location associated with the vendor of the I/O device 212, an indication of a device type for the I/O device 212, and/or a driver type associated with the I/O device 212.

Hypervisor 202 can abstract the I/O device 212 as virtual I/O device 232, in accordance with previously described embodiments. Bus manager 204 can determine whether hypervisor 202 is to associate the virtual I/O device 232 with virtual bus 226A or virtual bus 226B based on the set of parameters for I/O device 212. For example, bus manager 204 can retrieve the trusted set of parameters from memory 210 and can compare the trusted set of parameters to the set of parameters for the I/O device 212. In response to determining that I/O device 212 is a trusted I/O device, bus manager 204 can determine that hypervisor 202 is to associate the virtual I/O device 232 with virtual bus 226A. In response to determining that an underlying I/O device 212 is not a trusted I/O device, bus manager 204 can determine that hypervisor 202 is to associate the virtual I/O device 232 with virtual bus 226B.

In an illustrative example, hypervisor 202 can receive a request to associate hypervisor-controlled I/O device 212A with virtual machine 220 (e.g., in response to hypervisor-controlled I/O device 212A engaging with a slot of host machine 200). Hypervisor 202 can abstract hypervisor-controlled I/O device 212A as virtual I/O device 232A, in accordance with previously described embodiments. Bus manager 204 can determine whether a manufacturer and/or vendor associated with hypervisor-controlled I/O device 212A corresponds to a trusted manufacturer and/or vendor indicated in the set of trusted parameters. In response to bus manager 204 determining that the manufacturer and/or vendor associated with hypervisor-controlled I/O device 212A does not correspond to a trusted manufacturer and/or vendor, hypervisor 202 can associate virtual I/O device 232A with virtual bus 226B (i.e., an abstracted external interface slot) even though hypervisor-controlled I/O device 212A that underlies virtual I/O device 232A is directly coupled to bus 206 via an internal interface slot. In another illustrative example, hypervisor 202 can receive a request to associate host-controlled I/O device 212B with virtual machine 220. Hypervisor 202 can abstract host-controlled I/O device 212B as virtual I/O device 232B, in accordance with previously described embodiments. Bus manager can determine that a geographic location associated with a manufacturer of host-controlled I/O device 212B corresponds to a geographic location associated with a trusted I/O device manufacturer. Accordingly, hypervisor 202 can associate virtual I/O device 232B with virtual bus 226B (i.e., an abstracted internal interface slot) even though host-controlled I/O device 212B that underlies virtual I/O device 232B is coupled to bus 206 via an external interface slot.

In some embodiments, hypervisor 202 can associate a virtual I/O device 232 with a respective virtual bus 226 by generating a mapping between the virtual I/O device 232 and the associated virtual bus 226 and store the generated mapping at memory 210. In accordance with the previously provided examples, hypervisor 202 can generate a mapping between virtual I/O device 232A and virtual bus 226B and store the mapping at memory 210. Hypervisor 202 can similarly generate a mapping between virtual I/O device 232B and virtual bus 226A and store the mapping at memory 210, in some embodiments. In some embodiments, the generated mapping for a respective virtual I/O device 232 can include an indication of the underlying I/O device 212 associated with the virtual I/O device 232. For example, the mapping between virtual I/O device 232A and virtual bus 226B can include an indication of hypervisor-controlled I/O device 212A and the mapping between virtual I/O device 232B and virtual bus 226A can include an indication of host-controlled I/O device 212B. Hypervisor 202 can reference the generated mapping between the virtual I/O device 232 and associated virtual bus 226 to handle an I/O operation for the virtual I/O device 232, in accordance with embodiments described herein.

As described above, guest OS 224 can utilize virtual CPU 228, virtual memory 230, virtual I/O device 232A and/or virtual I/O device 232B to enable applications 222A and/or 222B at virtual machine 220. Virtual I/O device 232A and virtual device I/O device 232B can be associated with (also referred to as coupled to) virtual bus 226A or 226B, in accordance with previously described embodiments. As mentioned above, virtual bus 226A can be presented to virtual machine 220 as an abstraction of an internal I/O interface slot of host machine 200, regardless of whether hypervisor-controlled I/O device 212A or host-controlled I/O device 212B underlies the virtual I/O device 232 coupled to virtual bus 226A. Additionally or alternatively, virtual bus 226B can be presented to virtual machine 220 as an abstraction of an external I/O interface slot of host machine 200, regardless of whether hypervisor-controlled I/O device 212A or host-controlled I/O device 212B underlies the virtual I/O device 232.

Guest OS 224 can determine whether a virtual I/O device 232 is a trusted virtual I/O device or an untrusted virtual I/O device by determining whether the virtual I/O device 232 is coupled to virtual bus 226A (i.e., an abstraction of an internal I/O interface slot) and does not satisfy the trust criterion if the virtual I/O device 232 is coupled to virtual bus 226B (i.e., an abstraction of an external I/O interface slot). For example, guest OS 224 can determine that virtual I/O device 232A is an untrusted virtual I/O device because virtual I/O device 232A is coupled to virtual bus 226B. In another example, guest OS 224 can determine that virtual I/O device 232B is a trusted virtual I/O device because virtual I/O device 232B is coupled to virtual bus 226A. In some embodiments, guest OS 224 can be configured to initiate a different security protocol for a virtual I/O device 232 depending on whether the virtual I/O device 232 a trusted virtual I/O device (i.e., coupled to virtual bus 22A) or an untrusted virtual I/O device (i.e., coupled to virtual bus 226B). For example, guest OS 224 can initiate a first security protocol for virtual I/O device 232A and a second security protocol for virtual I/O device 232B. The first security protocol can include one or more operations that provide isolation between portions of virtual memory 230 that are accessible by virtual I/O device 232A (i.e., an "untrusted" virtual I/O device) and portions of virtual memory 230 that are not accessible by virtual I/O device 232A. These operations may not be included in the second protocol initiated for virtual I/O device 232B.

In some embodiments, the first security protocol performed by guest OS for an "untrusted" virtual I/O device 232 (e.g., virtual I/O device 232A) can include one or more operations corresponding to I/O memory management unit (IOMMU) protections. An IOMMU refers to a memory management unit (MMU) that resides on the I/O path connecting a device to memory. The IOMMU can map the device address space (e.g., a bus address) that is relevant to the I/O bus to an address space that is relevant to the memory bus. The IOMMU can include an IOMMU page table that includes a set of page table entries, such that each page table entry translates a device address to a host physical address of memory 210. The IOMMU can also include extra information associated with the address space mapping, such as memory access (e.g., read, write, etc.) permissions.

In some embodiments, the IOM MU can implement a bounce buffer at memory 210. A bounce buffer refers to a fixed memory buffer at memory 210 that can be accessed by "untrusted" I/O devices (e.g., host-controlled I/O device 212B, virtual I/O device 232B, etc.). Each device address at the IOMMU page table can be mapped to a physical address for the bounce buffer at memory 210. Hypervisor 202 can copy data associated with the untrusted virtual I/O device from an original physical address at memory 210 to a physical address at the bounce buffer, e.g., during initialization of the virtual I/O device, responsive to receiving a request to access the data, etc. Rather than accessing the requested data at the original physical address, hypervisor 202 can access the requested data at the physical address for the bounce buffer, as indicated in the IOMMU page table.

Virtual I/O device 232A can transmit a request, via virtual bus 226B, to access a memory page at virtual memory 230, in accordance with a virtual I/O operation. In some embodiments, the request can include an indication of a virtual address for the virtual memory page. Guest OS 224 can translate the virtual address for the virtual memory page to a virtual bus address for virtual I/O device 232A and forward the translated virtual bus address to hypervisor 202, in accordance with the first security protocol. Hypervisor 202 can access the IOM MU at host machine 200 and determine, based on the IOMMU, whether virtual I/O device 232A has permission to access the requested memory page (e.g., based on the extra information associated with the address space mapping for the memory page). In response to determining that the virtual I/O device 232A does not have permission to access the requested memory page, hypervisor 202 can transmit a notification to guest OS 224 indicating that virtual I/O device 232A does not have permission to access the requested memory page.

In response to determining that the virtual I/O device 232A has permission to access the requested memory page, the hypervisor can retrieve the data for the memory page at the physical address mapped to virtual bus address and transmit the retrieved data to guest OS 224. In some embodiments, the virtual bus address can be mapped to a physical address at a bounce buffer at memory 210. Accordingly, hypervisor 202 can retrieve the data for the memory page at the bounce buffer, in accordance with previously described embodiments. As described above, hypervisor 202 can copy data associated with virtual I/O device 232A to the bounce buffer, e.g., during an initialization of virtual I/O device 232A, in response to receiving the request from guest OS 224, etc. Guest OS 224 can forward the retrieved data for the memory page to virtual I/O device 232A via virtual bus 226B.

The first security protocol for virtual I/O device 232A can differ from the second security protocol for virtual I/O device 232B because the second security protocol may not include operations corresponding to the IOMMU protections that are included in the second security protocol. For example, virtual I/O device 232B can transmit a request, via virtual bus 226A, to access a memory page at virtual memory 230, in accordance with a virtual I/O operation. Guest OS 224 can forward the request to hypervisor 202, which can determine the physical address for the virtual memory page using the previously described page table, in accordance with the second security protocol. Hypervisor 202 can retrieve the data for the virtual memory page at the physical address mapped to the memory page and transmit the retrieved data to guest OS 224. Guest OS 224 can forward the data for the memory page to virtual I/O device 232B via virtual bus 226A.

In some embodiments, hypervisor 202 can change a mapping between a virtual I/O device 232 and a virtual bus 226 during a runtime of virtual machine 220. For example, bus manager 204 can determine that a set of parameters for hypervisor-controlled I/O device 212A corresponds to the set of trusted parameters for a trusted device and therefore can determine that hypervisor-controlled I/O device 212A is a trusted I/O device. Hypervisor 202 can abstract hypervisor-controlled I/O device 212A and present the abstraction as virtual I/O device 232A coupled to virtual bus 226A, causing guest OS 224 to initiate the second security protocol for virtual I/O device 232A, in accordance with previously described embodiments. During a runtime of the virtual machine, hypervisor 202 can receive an updated set of trusted parameters from virtual machine 220. Bus manager 204 can determine that the set of parameters for the hypervisor-controlled I/O device 212A does not correspond to the updated set of trusted parameters. In response to this determination, hypervisor 202 can remove the mapping between virtual I/O device 232A and virtual bus 226A and generate a mapping between virtual I/O device 232A and virtual bus 226B. The new mapping between virtual I/O device 232A and virtual bus 226B can cause guest OS 224 to initiate the first security protocol for virtual I/O device 232A, in accordance with previously described embodiments.

Figure 3:
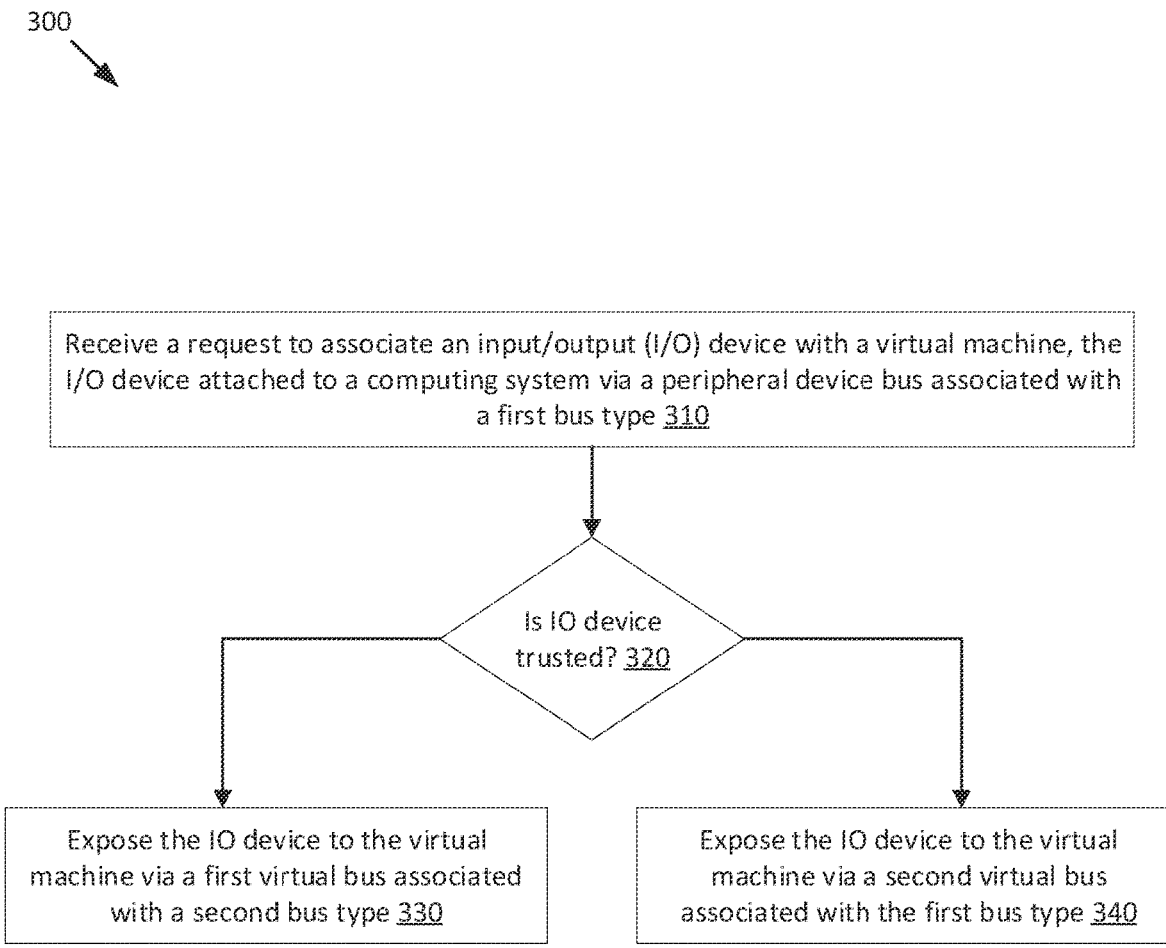
FIG. 3 is a flow diagram of a method of exposing an untrusted input/output (I/O) device to a virtual machine, in accordance with implementations of the present disclosure.

FIG. 3 depicts a flow diagram of a method 300 for exposing an untrusted input/output (TO) device to a virtual machine, in accordance with implementations of the present disclosure. Method 300 can be performed by bus manager 204 of FIG. 2, in accordance with previously described embodiments. Method 300 can be performed by processing logic that can comprise hardware (circuitry, dedicated logic, etc.), software (e.g., software executed by a general purpose computer system or a dedicated machine), or a combination of both. Method 300 and each individual functions, routines, subroutines, or operations can be performed by one or more processors of the computer device executing the method. In certain implementations, method 300 can be performed by a single processing thread. Alternatively, method 300 can be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts can be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring now to FIG. 3, at block 310, processing logic can receive a request to associate an I/O device with a virtual machine. In some embodiments, the I/O device can be a hypervisor-controlled I/O device, such as hypervisor-controlled I/O device 212A, or a host-controlled I/O device, such as host-controlled I/O device 212B. In additional or alternative embodiments, the virtual machine can be virtual machine 220. As described above, the I/O device can be attached to a first peripheral bus of a first bus type. For example, the hypervisor-controlled I/O device can be attached to an internal host bus (e.g., a PCI bus) via an internal interface slot (e.g., a PCI slot). Processing logic can receive the request to associate the I/O device with the virtual device during an initialization of virtual machine 220 or during a runtime of virtual machine 220. In some embodiments, processing logic can receive the request from a driver associated with the I/O device 212. In some embodiments, the request can include a set of parameters associated with the I/O device 212.

At block 320, processing logic can determine whether the I/O device is a trusted I/O device. In some embodiments, processing logic can determine that I/O device 212 is a trusted I/O device in response to determining that the I/O device 212 satisfies a security criterion. Processing logic can determine that I/O device 212 satisfies the security criterion in response to determining that a set of parameters associated with the I/O device 212 corresponds to a set of trusted parameters associated with the trusted I/O device. The set of parameters and the set of trusted parameters can each include at least one of an identifier of a manufacturer and/or a vendor of I/O device 212, a geographic location associated with the manufacturer and/or the vendor of I/O device 212, a device type associated with I/O device 212, or a driver type associated with I/O device 212. In an illustrative example, processing logic can determine that I/O device 212 is a trusted I/O device in response to determining that a manufacturer of I/O device 212, as indicated in the set of parameters for I/O device 212, corresponds to trusted manufacturer for a trusted I/O device, as indicated in the set of trusted parameters.

In response to processing logic determining that the I/O device 212 is not a trusted I/O device, method 300 can continue to block 330. At block 330, processing logic can expose the I/O device 212 to the virtual machine 220 via a first virtual bus associated with a second bus type. As described above, a virtual bus can be an abstraction of an interface slot of an I/O device 212 at a host machine, such as host machine 200. A virtual bus of the second type can be an abstraction of an external bus (e.g., a Thunderbolt bus) that includes an external interface slot (e.g., a Thunderbolt slot), as described above. In response to processing logic exposing I/O device 212 to virtual machine 220 via the first virtual bus, virtual machine 220 can initiate a first security protocol associated with the first virtual bus. The first security protocol can include one or more operations that provide isolation between portions of virtual memory, such as virtual memory 230, that are accessible by the virtual I/O device 232 that underlies the untrusted I/O device and portions of virtual memory 230 that are inaccessible by the virtual device. For example, the first security protocol can include one or more operations corresponding to IOMMU protections and/or bounce memory buffer operations.

In response to processing logic determining that the I/O device is a trusted I/O device, method 300 can continue to block 340. At block 340, processing logic can expose the I/O device to the virtual machine via a second virtual bus associated with the first bus type. As described above, virtual bus of the second type can be an abstraction of an internal bus (e.g., a PCI bus) that includes an internal interface slot (e.g., a PCI slot), as described above. In response to processing logic exposing I/O device 212 to virtual machine 220 via the second virtual bus, virtual machine 220 can initiate a second security protocol associated with the second virtual bus. The second security protocol may not include the same memory isolation operations (e.g., IOMMU operations, bounce buffer operations, etc.) that are included in the first security protocol.

In an illustrative example, processing logic can receive a request to associate a hypervisor-controlled I/O device 212A with virtual machine 220. In response to determining that hypervisor-controlled I/O device 212A is an untrusted device, processing logic can expose I/O device 212A as virtual I/O device 232A coupled to virtual bus 226B (i.e., an abstraction of an external I/O slot at host machine 200). During a runtime of virtual machine 220, guest OS 224 can initiate a first security protocol for virtual I/O device 232A, in view of the association of virtual I/O device 232A to virtual bus 226B. In response to determining that hypervisor-controlled I/O device 212A is a trusted I/O device, processing logic can expose hypervisor-controlled I/O device 212A as virtual I/O device 232A coupled to virtual bus 226B (i.e., an abstraction of an internal I/O slot at host machine 200). During a runtime of virtual machine 220, guest OS 224 can initiate a second security protocol for virtual I/O device 232A, in view of the association of virtual I/O device 232A to virtual bus 226B. In another illustrative example, processing logic can receive a request to associate a host-controlled I/O device 212B with virtual machine 220. In response to determining that host-controlled I/O device 212B is an untrusted device, processing logic can expose host-controlled I/O device 212B as virtual I/O device 232B coupled to virtual bus 226B, causing guest OS 224 to initiate the first security protocol for virtual I/O device 232B. In response to determining that host-controlled I/O device 212B is a trusted I/O device, processing logic can expose host-controlled I/O device 212B as virtual I/O device 232B coupled to virtual bus 226B, causing guest OS 224 to initiate the second security protocol for virtual I/O device 232B.

Figure 4:
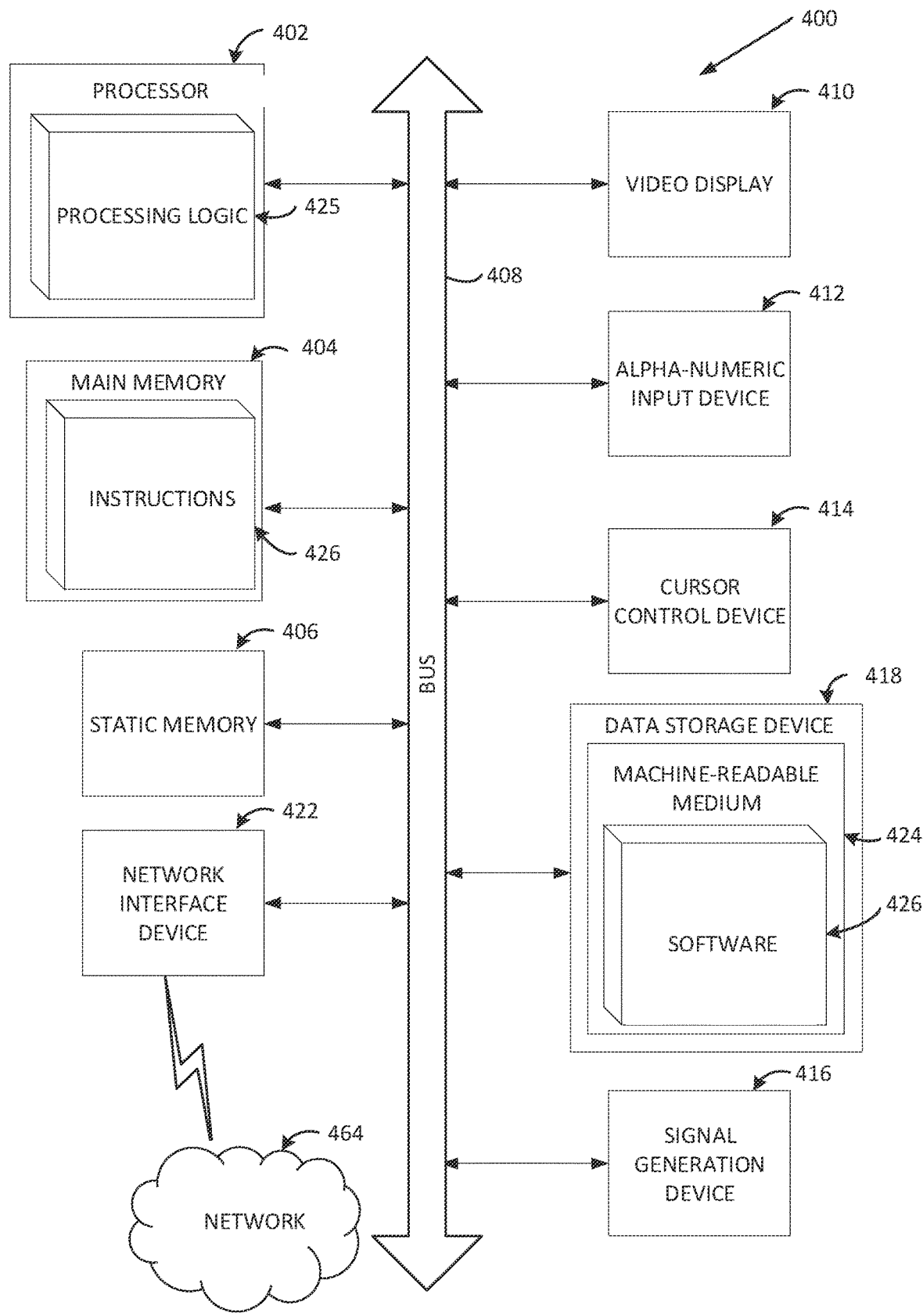
FIG. 4 is a block diagram illustrating a computer system in which implementations of the disclosure may be used.

FIG. 4 is a block diagram illustrating a computer system 400 in which implementations of the disclosure can be used. In some implementations, the computer system 400 can support maintaining passwords for network-accessible service accounts, in accordance with previously described embodiments.

In certain implementations, computer system 400 can be connected (e.g., via a network, such as a Local Area Network (LAN), an intranet, an extranet, or the Internet) to other computer systems. Computer system 400 can operate in the capacity of a server or a client computer in a client-server environment, or as a peer computer in a peer-to-peer or distributed network environment. Computer system 400 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 400 includes a processing device 402, a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 416, which communicate with each other via a bus 408.

Processing device 402 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is to execute the instructions 426 for performing the operations and steps discussed herein.

The computer system 400 can further include a network interface device 422 communicably coupled to a network 425. The computer system 400 also can include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Instructions 426 can reside, completely or partially, within volatile memory 404 and/or within processing device 402 during execution thereof by computer system 400, hence, volatile memory 404 and processing device 402 can also constitute machine-readable storage medium 424. Data storage device 416 can include a computer-readable storage medium 424 (e.g., a non-transitory computer-readable storage medium) on which can store instructions 426 encoding any one or more of the methods or functions described herein, including instructions for implementing method 300 of FIG. 3.

The non-transitory machine-readable storage medium 424 can also be used to store instructions 426 to support caching results of certain commands utilized for maintaining passwords for network-accessible service accounts described herein, and/or a software library containing methods that call the above applications. While the machine-accessible storage medium 424 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and does not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
receiving, by a hypervisor executing on a computing system, a request to associate an input/output (I/O) device with a virtual machine running on the computing system, wherein the I/O device corresponds to a physical device attached to a first peripheral bus of a first bus type;
determining whether the I/O device is a trusted I/O device; and
responsive to determining that the I/O device is not a trusted I/O device, exposing the I/O device to the virtual machine via a first virtual bus of a second bus type, thus causing the virtual machine to initiate a first security protocol associated with the first virtual bus.

2. The method of claim 1, further comprising:
responsive to determining that the I/O device is a trusted I/O device, exposing the I/O device to the virtual machine via a second virtual bus associated with a second type.

3. The method of claim 1, wherein determining whether the I/O device is a trusted I/O device for exposure to the virtual machine comprises:
obtaining a set of parameters associated with the I/O device; and
determining whether each of the set of parameters associated with the I/O device corresponds to a set of trusted I/O device parameters.

4. The method of claim 3, wherein the set of parameters associated with the I/O device comprises at least one of an identifier of a manufacturer of the I/O device, an identifier of a vendor associated with the I/O device, an identifier of a geographic location corresponding to the manufacturer of the I/O device, an identifier of a geographic location corresponding to the vendor associated with the I/O device, a device type associated with the I/O device, or a driver type associated with the I/O device.

5. The method of claim 3, further comprising:
receiving, from a guest operating system (OS) for the virtual machine, one or more of the set of trusted I/O device parameters.

6. The method of claim 1, wherein the first security protocol comprises one or more security operations corresponding to I/O memory management unit (MMU) protections.

7. The method of claim 1, wherein the first security protocol comprises one or more security operations corresponding to a bounce buffer at a memory for the computing system.

8. The method of claim 1, wherein the physical device is attached to a Peripheral Component Interconnect express (PCIe) slot at the computing system, and wherein exposing the I/O device to the virtual machine via the first virtual bus of the second bus type comprises exposing the physical device to the virtual machine as a device attached to a Thunderbolt slot at the computing system.

9. The method of claim 1, wherein the computing system is a cloud computing system.

10. A system comprising:
a memory device; and
a processor coupled to the memory device, the processor is configured to:
receive a request to associate an input/output (I/O) device with a virtual machine running on a computing system, wherein the I/O device corresponds to a physical device attached to a first peripheral bus of a first bus type;
determine whether the I/O device is a trusted I/O device; and
responsive to determining that the I/O device is not a trusted I/O device, expose the I/O device to the virtual machine via a first virtual bus of a second bus type, thus causing the virtual machine to initiate a first security protocol associated with the first virtual bus.

11. The system of claim 10, wherein the processor is further configured to:
responsive to determining that the I/O device is a trusted I/O device, expose the I/O device to the virtual machine via a second virtual bus associated with a second type.

12. The system of claim 10, wherein to determine whether the I/O device is a trusted I/O device for exposure to the virtual machine, the processor is configured to:
obtain a set of parameters associated with the I/O device; and
determine whether each of the set of parameters associated with the I/O device corresponds to a set of trusted I/O device parameters.

13. The system of claim 12, wherein the set of parameters associated with the I/O device comprises at least one of an identifier of a manufacturer of the I/O device, an identifier of a vendor associated with the I/O device, an identifier of a geographic location corresponding to the manufacturer of the I/O device, an identifier of a geographic location corresponding to the vendor associated with the I/O device, a device type associated with the I/O device, or a driver type associated with the I/O device.

14. The system of claim 12, wherein the processor is further configured to:
receive, from a guest operating system (OS) for the virtual machine, one or more of the set of trusted I/O device parameters.

15. The system of claim 10, wherein the first security protocol comprises one or more security operations corresponding to I/O memory management unit (MMU) protections.

16. The system of claim 10, wherein the first security protocol comprises one or more security operations corresponding to a bounce buffer at a memory for the computing system.

17. A non-transitory computer readable storage medium including instructions that, when executed by a processing device, cause the processing device to:
receive a request to associate an input/output (IO) device with a virtual machine running on a computing system, wherein the I/O device corresponds to a physical device attached to a first peripheral bus of a first bus type;
determine whether the I/O device is a trusted I/O device; and
responsive to determining that the I/O device is not a trusted I/O device, expose the I/O device to the virtual machine via a first virtual bus of a second bus type, thus causing the virtual machine to initiate a first security protocol associated with the first virtual bus.

18. The non-transitory computer readable storage medium of claim 17, wherein the processing device is further to:
responsive to determining that the I/O device is a trusted I/O device, expose the I/O device to the virtual machine via a second virtual bus associated with a second type.

19. The non-transitory computer readable storage medium of claim 17, wherein to determine whether the I/O device is a trusted I/O device for exposure to the virtual machine, the processing device is to:
obtain a set of parameters associated with the I/O device; and
determine whether each of the set of parameters associated with the I/O device corresponds to a set of I/O device trusted parameters.

20. The non-transitory computer readable storage medium of claim 19, wherein the set of parameters associated with the I/O device comprises at least one of an identifier of a manufacturer of the I/O device, an identifier of a vendor associated with the I/O device, an identifier of a geographic location corresponding to the manufacturer of the I/O device, an identifier of a geographic location corresponding to the vendor associated with the I/O device, a device type associated with the I/O device, or a driver type associated with the I/O device.

* * * * *